2,973,367
Patented Feb. 28, 1961

2,973,367
NOVEL PYRAZOLE CARBINOLS

Nelson Easton, Indianapolis, Ind., assignor to Eli Lilly and Company, Indianapolis, Ind., a corporation of Indiana No Drawing. Filed June 8, 1959, Ser. No. 818,555

6 Claims. (Cl. 260—310)

This invention relates to novel pyrazole carbinols. More particularly it relates to pyrazoles in which the 3-position of the pyrazole ring is substituted with a carbinol or carbinol ether grouping, and the 4-position of the pyrazole ring optionally is substituted with a halogen atom.

The pyrazole carbinols provided by this invention can be represented by the following formula:

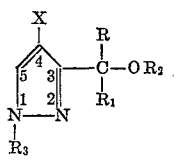

in which X is hydrogen, chlorine or bromine; $R_2$ is hydrogen or a methyl group; $R_3$ is hydrogen, a benzyl group or an alkyl group having from 1 to 3 carbon atoms; R is a phenyl group, a chlorophenyl group, or an alkyl group having from 1 to 6 carbon atoms; and $R_1$ is an alkyl group having from 1 to 6 carbon atoms. The sum of the carbon atoms in R and $R_1$ is between 3 and 8 when X is hydrogen and is between 2 and 8 when X is chlorine or bromine.

In the above formula, when R and $R_1$ represent alkyl groups containing from 1 to 6 carbon atoms, they can be, individually, a methyl radical, an ethyl radical, an n-propyl radical, an isopropyl radical, an n-butyl radical, an isobutyl radical, an n-amyl radical, and the like. However, as set forth hereinabove, the sum of the carbon atoms in R and $R_1$ is between 3 and 8 when the X substituent in the 4-position of the pyrazole ring is hydrogen and between 2 and 8 when X is chlorine or bromine. Thus, if X is hydrogen and R is methyl, $R_1$ must contain at least 3 but not more than 6 carbon atoms. In like fashion, if X is hydrogen and R is hexyl, $R_1$ can contain only one carbon atom. On the other hand, if, illustratively, X is chlorine and R is methyl, $R_1$ can contain from 2 to 6 carbon atoms, or if, for example, X is chlorine and R is hexyl, $R_1$ can contain only one carbon atom.

The following table further illustrates the possibilities of X, R and $R_1$ as substituents in the pyrazole carbinols coming within the scope of this invention, and shows illustrative permissible combinations of R and $R_1$, both when X is hydrogen, and when X is chlorine or bromine.

TABLE I

| When X=Hydrogen: | Sum of carbons in R and $R_1$ |
|---|---|
| 3-(3-hydroxy-3-pentyl)-pyrazole | 4 |
| 3-(2-hydroxy-2-hexyl)-pyrazole | 5 |
| 3-(3-hydroxy-2,4-dimethyl-3-pentyl)-pyrazole | 6 |
| 1-methyl-3-(1-hydroxy-1-phenyl-1-ethyl)-pyrazole | 7 |
| 1-benzyl-3-(4-hydroxy-4-heptyl)-pyrazole | 6 |
| 1-ethyl-3-(2-hydroxy-2-octyl)-pyrazole | 7 |

| When X=Chlorine or Bromine: | |
|---|---|
| 3-(3-hydroxy-3-pentyl)-4-chloropyrazole | 4 |
| 3-(2-hydroxy-2-butyl)-4-bromopyrazole | 3 |
| 3-(4-hydroxy-4-heptyl)-4-chloropyrazole | 6 |
| 1-benzyl-3-(2-hydroxy-2-butyl)-4-bromopyrazole | 3 |
| 1-propyl-3-(2-hydroxy-2-hexyl)-4-chloropyrazole | 5 |

The pyrazole carbinols provided by this invention are useful pharmacologically as anticonvulsants and muscle relaxants. This combination of properties makes possible their employment as sedatives or tranquilizers, particularly for veterinary use. They are orally effective and can be administered in the form of capsules, tablets or solutions.

The pyrazole carbinols of this invention are either low melting white crystalline solids or high boiling liquids. Those pyrazoles which contain substituents identified herein as R, $R_1$, $R_2$ and $R_3$ are prepared by formylating a substituted ketol and condensing the product of that reaction with a hydrazine to form the pyrazole ring. The sequence of reactions involved is represented by the following equation:

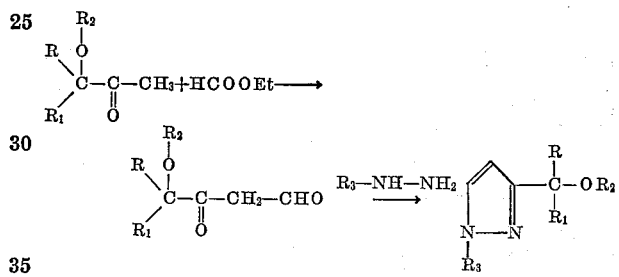

Those pyrazoles which contain in addition a chlorine or bromine in the 4-position of the pyrazole ring are prepared by direct halogenation.

As can be seen from the above equation, the particular R, $R_1$ and $R_2$ groups which are desired in the final product must be present as such in the ketol starting material. The various ketols can be prepared by hydrating the corresponding acetylenic carbinol using sulfuric acid and mercuric oxide as catalysts. The acetylenic carbinols themselves are readily prepared by the action of sodium acetylide upon a ketone.

When it is desired to employ a lower alkyl ether of an acetylenic carbinol, the ether compound can readily be prepared by the method of Hennion and Fleck, J. Am. Chem. Soc. 77, 3257 (1955), in which the hydroxyl group of the acetylenic carbinol is alkylated by the action of an alcohol using concentrated sulfuric acid as a catalyst. The acetylenic ether thus prepared is then hydrated by customary procedures to yield an α-keto ether useful as a starting material in the above synthesis.

When the substituent represented by $R_3$ in the above formula is a benzyl group or an alkyl group having from 1 to 6 carbon atoms, it can be introduced directly into the pyrazole molecule by known alkylation methods, for example, by forming the sodium salt of the pyrazole and reacting this salt with an alkyl halide. Alternatively, the benzyl or alkyl group can be provided in the pyrazole molecule by having said group initially present as a substituent in the hydrazine molecule which is used in the cyclization step.

An alternative method of preparation of certain of the compounds corresponding to the above formula is available when the groups R and $R_1$ are identical. This method of preparation involves the reaction of, for example, ethylpyrazole-3-carboxylate with a Grignard reagent as illustrated in the following equation:

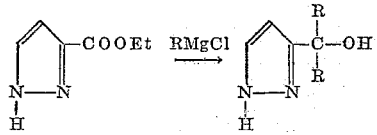

It will be apparent from inspection of the general formulae given for the novel compounds of this invention that those pyrazoles in which the $R_3$ substituent is hydrogen can exist in tautomeric forms. For the sake of simplicity, it has been represented in the general formula that the hydrogen is located on that nitrogen atom identified by the integer 1. Additionally, those pyrazoles in which $R_3$ is a benzyl or an alkyl group have been assumed to be substituted with the benzyl or alkyl group on the nitrogen atom at position 1. It is to be understood, however, that the alternative forms which involve the nitrogen at position 2 are to be regarded as equivalent, and that both forms are to be considered within the scope of this invention.

The following examples further illustrate the nature of this invention.

EXAMPLE 1

*Preparation of 3-(3-hydroxy-3-pentyl)-pyrazole*

To a suspension of 36 g. of sodium hydride in 3 l. of anhydrous diethyl ether was added slowly with stirring a mixture of 130 g. of diethylacetylcarbinol and 100 g. of ethyl formate. After the addition had been completed, the reaction mixture was stirred at ambient room temperature for about eight hours. The sodium salt of hydroxymethylene diethylacetylcarbinol precipitated from solution as it was formed. Sufficient water was added to the reaction mixture to dissolve the precipitate, and the water layer which contained the dissolved sodium salt was separated from the ether layer and was added to a mixture of 59 g. of 85 percent hydrazine hydrate and 90 g. of acetic acid. Sufficient ethanol was added to make the reaction mixture homogenous, and the mixture was heated at about 100° C. for about two hours, thus forming 3-(3-hydroxy-3-pentyl)-pyrazole. The reaction mixture was cooled and sufficient solid potassium carbonate was added to make a solution saturated with respect to potassium carbonate. The pyrazole was extracted from the water layer with two portions of 350 ml. of ether. The ether extracts were combined, dried, and concentrated in vacuo to a residue comprising 3-(2-hydroxy-3-pentyl)-pyrazole. This residue was distilled at a pressure of about 0.3 mm. of mercury, and the fraction boiling in the range 125–132° C. was collected. The fraction which weighed 102 g. consisted of purified 3-(3-hydroxy-3-pentyl)-pyrazole.

*Analysis.*—Calculated: N, 18.17. Found: N, 17.97.

3-(3-hydroxy-3-pentyl)-pyrazole thus prepared was dissolved in diethyl ether. Dry gaseous hydrogen chloride was bubbled into the ethereal solution thus forming the insoluble hydrochloride salt of the pyrazole. The pyrazole hydrochloride precipitated and was separated by filtration. 3-(3-hydroxy-3-pentyl)-pyrazole hydrochloride thus prepared melted at about 124–126° C. after recrystallization from an ethanol-ether solvent mixture.

EXAMPLE 2

*Preparation of 4-chloro-3-(3-hydroxy-3-pentyl)-pryazole*

To 100 g. of 3-(3-hydroxy-3-pentyl)-pyrazole dissolved in 200 ml. of cold (10° C.) pyridine was added slowly and with stirring a solution of 46 g. of chlorine in 400 ml. of carbon tetrachloride. After the addition of the chlorine has been completed, the reaction mixture was poured into 1 l. of water. The organic layer containing 4-chloro-3-(3-hydroxy-3-pentyl)-pyrazole thus prepared was separated from the aqueous layer and the aqueous layer was extracted with two successive 500 ml. portions of ether. The organic layer and the ether extracts were combined and the resulting solution was washed five times with 500 ml. portions of water. The organic solution was then dried and the solvent evaporated in vacuo leaving a residue comprising 4-chloro-3-(3-hydroxy-3-pentyl)-pyrazole. The residue was crystallized and recrystallized from n-hexane to yield 95 g. of 4-chloro-3-(3 hydroxy-3-pentyl)-pyrazole melting at about 111–113° C.

*Analysis.*—Calculated: N, 14.84. Found: N, 14.67.

EXAMPLE 3

*Preparation of 3-(2-hydroxy-5-methyl-2-pentyl)-pyrazole*

A reaction was carried out following the procedure of Example 1 except that isobutylmethylacetylcarbinol was employed in place of diethylacetylcarbinol. 3-(2-hydroxy-5-methyl-2-pentyl)-pyrazole thus prepared boiled in the range 150–155° C. at a pressure of about 7 mm. of mercury. It solidified upon standing. The solid melted at about 48–50° C.

*Analysis.*—Calculated: N, 16.65. Found: N, 16.42.

3-(2-hydroxy-5-methyl-2-pentyl)-pyrazole was chlorinated by the procedure of Example 2 to yield 4-chloro-3-(2-hydroxy-5-methyl-2-pentyl)-pyrazole which melted at about 88–89° C. after recrystallization from hexane.

*Analysis.*—Calculated: N, 13.82. Found: N, 13.70.

EXAMPLE 4

*Preparation of 3-[1-hydroxy-1-(p-chlorophenyl)-1-ethyl]-pyrazole*

A reaction was carried out following the procedure of Example 1 except that p-chlorophenylmethylacetylcarbinol was employed in place of diethylacetylcarbinol. 3-[1-hydroxy-1-(p-chlorophenyl)-1-ethyl]-pyrazole thus prepared melted at about 87–88° C.

*Analysis.*—Calculated: N, 12.58. Found: N, 12.32.

Following the procedure of Example 1, 3-[1-hydroxy-1-(p-chlorophenyl)-1-ethyl]-pyrazole hydrochloride was prepared. It melted at about 167–169° C. after recrystallization from a solvent mixture comprising ethanol, ethyl acetate and diethyl ether.

*Analysis.*—Calculated: N, 10.81. Found: N, 10.49.

EXAMPLE 5

*Preparation of 4-bromo-(3-hydroxy-3-pentyl)-pyrazole*

The procedure of Example 2 was followed except that bromine was used in place of chlorine. 4-bromo-(3-hydroxy-3-pentyl)-pyrazole prepared in this way melted at about 104–106° C. after recrystallization from hexane.

*Analysis.*—Calculated: N, 12.02. Found: N, 11.84.

EXAMPLE 6

*Preparation of 4-chloro-3-(2-hydroxy-2-propyl)-pyrazole*

A reaction was carried out following the procedure of Example 1 except that dimethylacetylcarbinol was used in place of diethylacetylcarbinol. 3-(2-hydroxy-2-propyl)-pyrazole thus prepared melted at about 107–108° C.

*Analysis.*—Calculated: N, 22.21. Found: N, 22.06.

3-(2-hydroxy-2-propyl)-pyrazole was chlorinated by the method of Example 2 to yield 4-chloro-3-(2-hydroxy-2-propyl)-pyrazole which melted at about 143–145° C. after recrystallization from a mixture of ethyl acetate, methylcyclohexane and pentane.

*Analysis.*—Calculated: N, 17.44. Found: N, 17.17.

EXAMPLE 7

*Preparation of 4-chloro-3-(2-hydroxy-2-butyl)-pyrazole*

A reaction was carried out following the procedure of Example 1 except that acetylethylmethylcarbinol was employed in place of diethylacetylcarbinol. 3-(2-hydroxy-2-butyl)-pyrazole thus prepared melted at about 79–80° C. The corresponding hydrochloride salt was prepared by adding alcoholic hydrogen chloride to an ether solution of 3-(2-hydroxy-2-butyl)-pyrazole. 3-(2-hydroxy-2-butyl)-pyrazole hydrochloride precipitated, was separated by filtration and was recrystallized from a mixture of ethanol and ether, yielding crystals melting at about 118–119° C.

*Analysis.*—Calculated: N, 15.86. Found: N, 15.74.

3-(2-hydroxy-2-butyl)-pyrazole was chlorinated by the procedure of Example 2 to yield 4-chloro-3-(2-hydroxy-2-butyl)-pyrazole which melted at about 76–78° C. after recrystallization from hexane.

*Analysis.*—Calculated: N, 16.04. Found: N, 16.12.

EXAMPLE 8

*Preparation of 3-(2-hydroxy-3-methyl-2-butyl)-pyrazole*

A reaction was carried out following the procedure of Example 1 except that the acetylmethylisopropylcarbinol was employed in place of diethylacetylcarbinol. 3-(2-hydroxy-3-methyl-2-butyl)-pyrazole thus prepared distilled in the range 104–118° C. at a pressure of about 0.5 mm. of mercury.

*Analysis.*—Calculated: N, 18.72. Found: N, 18.40.

3-(2-hydroxy-3-methyl-2-butyl)-pyrazole was chlorinated by the procedure of Example 2 to yield 4-chloro-3-(2-hydroxy-3-methyl-2-butyl)-pyrazole which melted at about 85–87° C. after recrystallization from hexane.

*Analysis.*—Calculated: N, 14.84. Found: N, 14.57.

EXAMPLE 9

*Preparation of 3-(3-hydroxy-3-hexyl)-pyrazole*

A reaction was carried out following the procedure of Example 1 except that acetylethyl-n-propylcarbinol was employed in place of diethylacetylcarbinol. 3-(3-hydroxy-3-hexyl)-pyrazole thus prepared distilled in the range 118–128° C. at a pressure of about 0.1 mm. of mercury.

*Analysis.*—Calculated: N, 16.65. Found: N, 16.73.

Following the procedure of Example 2, 3-(3-hydroxy-3-hexyl)-pyrazole was chlorinated to yield 4-chloro-3-(3-hydroxy-3-hexyl)-pyrazole which melted at about 66–68° C. after recrystallization from pentane.

*Analysis.*—Calculated: N, 13.82. Found: N, 13.94.

EXAMPLE 10

*Preparation of 3-(3-hydroxy-3-heptyl)-pyrazole*

A reaction was carried out following the procedure of Example 1 except that acetylethyl-n-butylcarbinol was employed in place of diethylacetylcarbinol. 3-(3-hydroxy-3-heptyl)-pyrazole thus prepared distilled in the range 150–165° C. at a pressure of about 0.5 mm. of mercury.

*Analysis.*—Calculated: N, 15.37. Found: N, 15.51.

EXAMPLE 11

*Preparation of 3-(2-hydroxy-2-heptyl)-pyrazole*

A reaction was carried out following the procedure of Example 1 except that acetylmethyl-n-amylcarbinol was employed in place of diethylacetylcarbinol. 3-(2-hydroxy-2-heptyl)-pyrazole thus prepared was isolated as an oily residue.

Alcoholic hydrogen chloride was added to a solution of 3-(2-hydroxy-2-heptyl)-pyrazole in ether thus forming 3-(2-hydroxy-2-heptyl)-pyrazole hydrochloride which crystallized after standing for about 24 hours at 0° C. The crystals which were collected by filtration melted at about 82–84° C.

*Analysis.*—Calculated: N, 12.81. Found: N, 12.61.

EXAMPLE 12

*Preparation of 3-(1-hydroxy-1-phenyl-1-ethyl)-pyrazole*

A reaction was carried out following the procedure of Example 1 except that acetylmethylphenylcarbinol was employed in place of diethylacetylcarbinol. 3-(1-hydroxy-1-phenyl-1-ethyl)-pyrazole was isolated as an oily residue.

3-(1-hydroxy-1-phenyl-1-ethyl)-pyrazole was converted to the corresponding hydrochloride salt by adding alcoholic hydrogen chloride to an ethereal solution of the pyrazole. 3-(1-hydroxy-1-phenyl-1-ethyl)-pyrazole hydrochloride thus formed melted at about 123–124° C. after being recrystallized from a mixture of ethyl acetate and ethanol.

*Analysis.*—Calculated: N, 12.47. Found: N, 12.67.

Following the procedure of Example 2, 3-(1-hydroxy-1-phenyl-1-ethyl)-pyrazole was chlorinated to yield 4-chloro-3-(1-hydroxy-1-phenyl-1-ethyl)-pyrazole which melted at about 113–115° C. after recrystallization from a mixture of benzene and methylcyclohexane.

*Analysis.*—Calculated: N, 12.58. Found: N, 12.65.

EXAMPLE 13

*Preparation of 1-methyl-3-(2-hydroxy-4-methyl-2-pentyl)-pyrazole*

A reaction was carried out following the procedure of Example 1 except that acetylmethylisobutylcarbinol was employed in place of diethylacetylcarbinol, and methylhydrazine was used in place of hydrazine hydrate. 1-methyl-3-(2-hydroxy-4-methyl-2-pentyl)-pyrazole thus prepared distilled in the range 90–110° C. at a pressure of about 0.75 mm. of mercury.

*Analysis.*—Calculated: N, 15.37. Found: N, 15.47; $n_D^{25}=1.486$.

EXAMPLE 14

*Preparation of 4-chloro-1-methyl-3-(2-hydroxy-2-propyl)-pyrazole*

A reaction was carried out following the procedure of Example 1 except that dimethylacetylcarbinol was used in place of diethylacetylcarbinol, and methylhydrazine was used in place of hydrazine hydrate. 1-methyl-3-(2-hydroxy-2-propyl)-pyrazole prepared in this way distilled in the range 73–78° C. at a pressure of about 0.5 mm. of mercury.

*Analysis.*—Calculated: N, 19.99. Found: N, 19.59; $n_D^{25}=1.496$.

Following the procedure of Example 2, 1-methyl-3-(2-hydroxy-2-propyl)-pyrazole was chlorinated to yield 4-chloro-1-methyl-3-(2-hydroxy-2-propyl)-pyrazole which melted at about 47–49° C. after recrystallization from pentane.

*Analysis.*—Calculated: N, 16.04. Found: N, 15.78.

EXAMPLE 15

*Preparation of 1-methyl-3-(3-hydroxy-3-pentyl)-pyrazole*

A preparation was carried out following the procedure of Example 1 except that methylhydrazine was used in place of hydrazine. 1-methyl-3-(3-hydroxy-3-pentyl)-pyrazole thus prepared distilled in the range 95–100° C. at a pressure of about 5 mm. of mercury.

*Analysis.*—Calculated: N, 16.65. Found: N, 16.39; $n_D^{25}=1.495$.

Following the procedure of Example 2, 1-methyl-3-(3-hydroxy-3-pentyl)-pyrazole was chlorinated to yield 4-chloro-1-methyl-3-(3-hydroxy-3-pentyl)-pyrazole which was purified by distillation. 4-chloro-1-methyl-3-(3-hydroxy-3-pentyl)-pyrazole distilled in the range 100–106° C. at a pressure of about 0.05 mm. of mercury. The distillate solidified and yielded crystalline 4-chloro-1-methyl-3-(3-hydroxy-3-pentyl)-pyrazole melting at about 67–68° C. after recrystallization from pentane.

*Analysis.*—Calculated: N, 13.82. Found: N, 13.65.

EXAMPLE 16

*Preparation of 3-(1-methoxy-1-phenyl-1-ethyl)-pyrazole*

A reaction was carried out following the procedure of Example 1, except that 1-methoxy-1-phenylethyl-methylketone was employed in place of diethylacetylcarbinol. 3-(1-methoxy-1-phenyl-1-ethyl)-pyrazole thus prepared was purified by distillation. The distillate solidified, and after recrystallization from pentane it melted at about 50–52° C.

*Analysis.*—Calculated: N, 13.85. Found: N, 13.58.

The corresponding hydrochloride salt was prepared by adding alcoholic hydrogen chloride to an ethereal solution of 3-(1-methoxy-1-phenyl-1-ethyl)-pyrazole. Recrystallization of 3-(1-methoxy-1-phenyl-1-ethyl)-pyrazole hydrochloride from a mixture of ethanol and ethyl acetate yielded crystals melting at about 122–124° C.

*Analysis.*—Calculated: N, 11.74. Found: N, 11.98.

EXAMPLE 17

*Preparation of 4-chloro-1-methyl-3-(2-hydroxy-2-butyl)-pyrazole*

A preparation was carried out following the procedure of Example 1, except that methylhydrazine was used in place of hydrazine, and methylethylacetylcarbinol was used in place of diethylacetylcarbinol. 1-methyl-3-(2-hydroxy-2-butyl)-pyrazole thus prepared was chlorinated by the procedure of Example 2 to yield 4-chloro-1-methyl-3-(2-hydroxy-2-butyl)-pyrazole. The compound distilled in the range 100–103° C. at a pressure of about 0.3 mm. of mercury.

*Analysis.*—Calculated: N, 14.84. Found: N, 14.56.

EXAMPLE 18

*Preparation of 3-(2-hydroxy-2-pentyl)-pyrazole*

A reaction was carried out following the procedure of Example 1, except that acetylmethyl-n-propylcarbinol was employed in place of diethylacetylcarbinol. 3-(2-hydroxy-2-pentyl)-pyrazole thus prepared boiled in the range 115–120° C. at a pressure of about 0.3 mm. of mercury.

*Analysis.*—Calculated: N, 18.17. Found: N, 17.92; $n_D^{25}=1.502$.

Following the procedure of Example 2, 3-(2-hydroxy-2-pentyl)-pyrazole was chlorinated to yield 4-chloro-3-(2-hydroxy-2-pentyl)-pyrazole which melted at about 63–65° C. after recrystallization from pentane.

*Analysis.*—Calculated: N, 14.84. Found: N, 14.78.

EXAMPLE 19

*Preparation of 3-(2-hydroxy-2-octyl)-pyrazole*

A preparation was carried out following the procedure of Example 1, except that acetylmethyl-n-hexylcarbinol was used in place of diethylacetylcarbinol. 3-(2-hydroxy-2-octyl)-pyrazole thus prepared distilled in the range 130–135° C. at a pressure of about 0.05 mm. of mercury.

*Analysis.*—Calculated: N, 14.27. Found: N, 14.05; $n_D^{25}=1.452$.

3-(2-hydroxy-2-octyl)-pyrazole was chlorinated by the method of Example 2 to yield 4-chloro-3-(2-hydroxy-2-octyl)-pyrazole which melted at about 49–51° C. after recrystallization from pentane.

*Analysis.*—Calculated: N, 12.14. Found: N, 11.92.

EXAMPLE 20

*Preparation of 3-(4-hydroxy-4-heptyl)-pyrazole*

A reaction was carried out following the procedure of Example 1, except that acetyl-di-n-propylcarbinol was used in place of diethylacetylcarbinol. 3-(4-hydroxy-4-heptyl)-pyrazole thus prepared distilled at about 133–135° C. at a pressure of about 0.2 mm. of mercury.

*Analysis.*—Calculated: N, 15.37. Found: N, 15.17.

Following the procedure of Example 2, 3-(4-hydroxy-4-heptyl)-pyrazole was chlorinated to yield 4-chloro-3-(4-hydroxy-4-heptyl)-pyrazole which melted at about 92–93° C. after recrystallization from pentane.

*Analysis.*—Calculated: N, 12.93. Found: N, 12.69.

EXAMPLE 21

*Preparation of 3-(1-methoxy-1-p-chlorophenyl-1-ethyl)-pyrazole*

A reaction was carried out following the procedure of Example 1, except that 3-p-chlorophenyl-3-methoxybutan-2-one was used in place of diethylacetylcarbinol. 3-(1-methoxy-1-p-chlorophenyl-1-ethyl)-pyrazole thus prepared distilled at about 170° C. at a pressure of about 0.3 mm. of mercury. The distillate which solidified upon standing was recrystallized from hexane. Crystalline 3-(1-methoxy-1-p-chlorophenyl-1-ethyl)-pyrazole thus obtained melted at about 78–88° C.

*Analysis.*—Calculated: N, 11.84. Found: N, 12.05.

EXAMPLE 22

*Preparation of 1-benzyl-3-(2-hydroxy-2-propyl)-pyrazole*

A reaction was carried out following the procedure of Example 1, except that dimethylacetylcarbinol was employed in place of diethylacetylcarbinol, and benzylhydrazine was used in place of hydrazine. 1-benzyl-3-(2-hydroxy-2-propyl)-pyrazole thus prepared distilled in the range 119–121° C. at at pressure of about 0.3 mm. of mercury.

*Analysis.*—Calculated: N, 12.95. Found: N, 12.74; $n_D^{25}=1.550$.

EXAMPLE 23

*Preparation of 3-(3-hydroxy-2,4-dimethylpentyl)-pyrazole*

To 57.2 g. of butylpyrazole-3-carboxylate dissolved in ether was added a solution of 1.6 moles of isopropyl magnesium bromide in 2 l. of ether. The reaction mixture was allowed to stand at ambient room temperature for four days and was then decomposed by mixing it with a saturated ammonium chloride solution. The ether layer which contained the 3-(3-hydroxy-2,4-dimethylpentyl)-pyrazole was separated, was dried and was concentrated in vacuo. The residue comprising 3-(3-hydroxy-2,4-dimethylpentyl)-pyrazole was distilled, and the fraction boiling at about 117–118° C. at a pressure of about 0.05 mm. of mercury was collected. It comprised 3-(3-hydroxy-2,4-dimethylpentyl)-pyrazole.

*Analysis.*—Calculated: N, 15.37. Found: N, 15.67.

Following the procedure of Example 2, 3-(3-hydroxy-2,4-dimethyl-3-pentyl)-pyrazole was chlorinated to yield 4-chloro-(3-hydroxy-2,4-dimethyl-3-pentyl)-pyrazole which melted at about 117–118° C. after recrystallization from pentane.

EXAMPLE 24

*Preparation of 3-p-chlorophenyl-3-methoxybutan-2-one* p-Chlorophenylmethylethynylcarbinol was methylated according to the procedure used by Hennion and Fleck, J. Am. Chem. Soc. 77, 3527 (1955) for the preparation of 2-methoxy-2-phenyl-3-butyne. 2-methoxy-2-p-chlorophenyl-3-butyne thus prepared boiled at about 94–95° C. at a pressure of about 4.5 mm. of mercury.

*Analysis.*—Calculated: C, 67.87; H, 5.70. Found: C, 67.63; H, 5.60; $n_D^{25}=1.527$.

The compound was hydrated by the action of sulfuric acid and water in the presence of red mercuric oxide to yield 3-p-chlorophenyl-3-methoxybutan-2-one. 3-p-chlorophenyl-3-methoxybutan-2-one thus prepared boiled at about 120–122° C. at a pressure of about 6 mm. of mercury.

*Analysis.*—Calculated: C, 62.12; H, 6.16. Found: C, 62.01; H, 5.90; $n_D^{25}=1.522$.

EXAMPLE 25

*Preparation of n-hexylmethylacetylcarbinol*

One mole of n-hexylmethylketone was reacted with one mole of sodium acetylide in liquid ammonia. After the completion of the reaction, the ammonia was allowed to evaporate while the reaction flask warmed up to about 25° C. The reaction mixture which contained the sodium salt of n-hexylmethylethynylcarbinol was decomposed with dilute acid thus forming the free carbinol which was extracted into ether and distilled. n-Hexylmethylethynylcarbinol boiled at about 78–82° C. at a pressure of about 5.5 mm. of mercury.

*Analysis.*—Calculated: C, 77.86; H, 11.76. Found: C, 78.44; H, 12.20; $n_D^{25}=1.437$.

A mixture of 6 ml. of water, 3 g. of concentrated sulfuric acid and 150 ml. of methanol was heated to about 55° C. and 3 g. of red mercuric oxide were added. A solution of 66 g. of n-hexylmethylethynylcarbinol in 150 ml. of methanol and 15 ml. of water was added dropwise to the mixture. After about one-half of the acetylene compound had been added, an additional 1.5 g. of red mercuric oxide were added to the mixture, after which the remainder of the acetylene compound was added. After the addition had been completed, another 1.5 g. of red mercuric oxide were added and the mixture was stirred at about 55° C. for one hour during which time an additional 30 ml. of water were added. The reaction mixture was cooled and was filtered into about 300 ml. of brine. The n-hexylmethylethynylcarbinol formed in the above reaction was extracted from the brine layer with three successive 200 ml. portions of ether. The combined ether extracts were washed successively with 300 ml. of brine, 225 ml. of sodium carbonate and two 225 ml. portions of water. The ether solution was dried and the ether removed therefrom in vacuo. The residue containing the n-hexylmethylethynylcarbinol was distilled, and the fraction boiling in the range 94–98° C. at a pressure of about 7 mm. of mercury was collected.

*Analysis.*—Calculated: C, 55.42; H, 7.91. Found: C, 55.03; H, 8.01; $n_D^{25}=1.431$.

EXAMPLE 26

*Preparation of ethyl-n-propylacetylcarbinol*

Following the procedure of Example 25 hexanone-3 was reacted with sodium acetylide in liquid ammonia to yield ethylethynyl-n-propylcarbinol which distilled in the range 103–104° C. at a pressure of about 135 mm. of mercury.

*Analysis.*—Calculated: C, 76.14; H, 11.18. Found: C, 76.09; H, 11.29; $n_D^{25}=1.436$.

Ethylethynyl-n-propylcarbinol thus prepared was hydrated by the procedure of Example 25 to yield ethyl-n-propylacetylcarbinol which distilled in the range 67–68° C. at a pressure of about 20 mm. of mercury. $n_D^{25}=1.426$.

EXAMPLE 27

*Preparation of ethyl-n-butylacetylcarbinol*

Following the procedure of Example 25 heptanone-3 was condensed with sodium acetylide to yield ethylethynyl-n-butylcarbinol which distilled in the range 125–127° C. at a pressure of about 160 mm. of mercury.

*Analysis.*—Calculated: C, 77.09; H, 11.50. Found: C, 77.02; H, 12.12; $n_D^{25}=1.439$.

Ethylethynyl-n-butylcarbinol thus prepared was hydrated by the procedure of Example 25 to yield ethyl-n-butylacetylcarbinol which distilled in the range 82–83° C. at a pressure of about 11.5 mm. of mercury.

*Analysis.*—Calculated: C, 68.31; H, 11.47. Found: C, 68.07; H, 11.27; $n_D^{25}=1.430$.

I claim:

1. A compound selected from the class consisting of nitrogenous bases represented by the formulas:

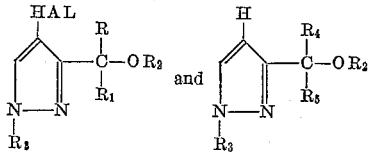

wherein HAL is chosen from the group consisting of chlorine and bromine, $R_2$ is chosen from the group consisting of hydrogen and methyl, $R_3$ is chosen from the group consisting of hydrogen, benzyl and alkyl having from 1 to 3 carbon atoms, R and $R_4$ are chosen from the group consisting of phenyl, chlorophenyl and alkyl having from 1 to 6 carbon atoms, and $R_1$ and $R_5$ are alkyl groups having from 1 to 6 carbon atoms, the sum of the carbon atoms in R and $R_1$ lying between 2 and 8 and the sum of the carbon atoms in $R_4$ and $R_5$ lying between 3 and 8.

2. 4-chloro-3-(3-hydroxy-3-pentyl)-pyrazole.
3. 3-(2-hydroxy-4-methyl-2-pentyl)-pyrazole.
4. 4-chloro-3-(2-hydroxy-3-methyl-2-butyl)-pyrazole.
5. 4-chloro-3-(3-hydroxy-3-hexyl)-pyrazole.
6. 3-(1-methoxy-1-p-chlorophenyl-1-ethyl)-pyrazole.

References Cited in the file of this patent

UNITED STATES PATENTS 2,655,506    Jones _____ Oct. 13, 1953
2,655,507    Jones _____ Oct. 13, 1953

OTHER REFERENCES

Rojahn et al.: Chem. Abstracts, vol. 18, p. 2340 (1924).

Jones et al.: Chem. Abstracts, vol. 49, col. 15874 (1955).